C. C. R. HAMMAR.
EXTRACTOR.
APPLICATION FILED MAR. 27, 1914. RENEWED JULY 28, 1915.

1,153,070.

Patented Sept. 7, 1915.

WITNESSES:
L. L. Aurket.
H. C. Pattison.

INVENTOR.
Charles C. R. Hammar,
BY A. S. Pattison
ATTORNEY

UNITED STATES PATENT OFFICE.

CHARLES C. R. HAMMAR, OF NEW DULUTH, MINNESOTA.

EXTRACTOR.

1,153,070. Specification of Letters Patent. Patented Sept. 7, 1915.

Application filed March 27, 1914, Serial No. 827,653. Renewed July 28, 1915. Serial No. 42,454.

*To all whom it may concern:*

Be it known that I, CHARLES C. R. HAMMAR, a citizen of the United States, residing at New Duluth, in the county of St. Louis and State of Minnesota, have invented certain new and useful Improvements in Extractors, of which the following is a specification, reference being had therein to the accompanying drawing.

This invention relates to improvements in extractors, the primary object of which is to produce a simple and inexpensive apparatus which is adapted to extract one element from another element when the said elements are frictionally connected.

Another object of the present invention is to produce an extractor which is especially adapted to extract keys such as are employed in the union of pulley, gears, shafting and the like.

Figure 1:
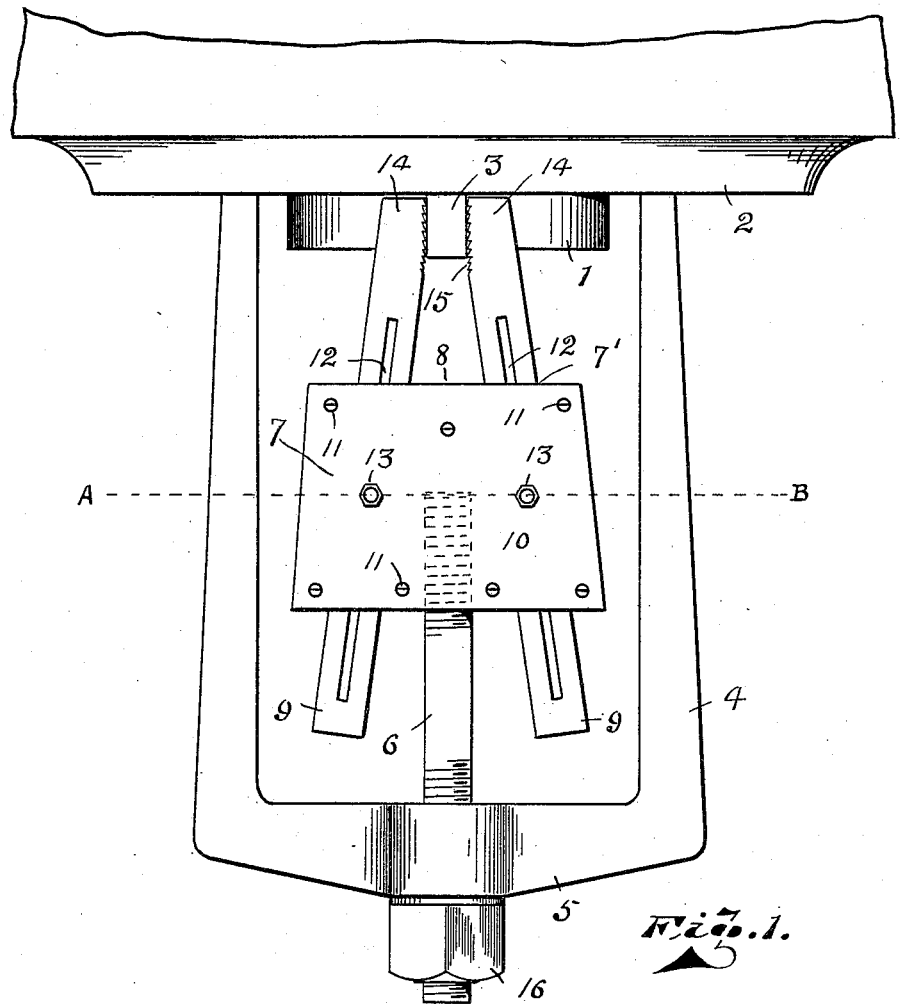
Figure 2:
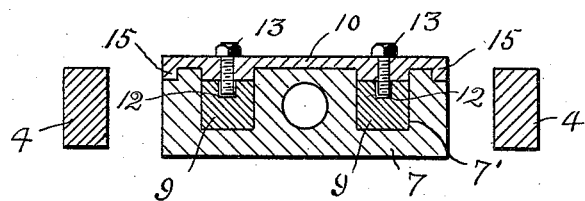

In the accompanying drawings:—Figure 1 is a side elevation of my improved extractor shown applied to a key. Fig. 2 is a cross sectional view taken on the line A—B of Fig. 1.

In disclosing my invention, I have shown it applied to the end of a shaft having a hub mounted thereon which is held to the said shaft by the means of a key, but it is readily understood that my extractor may be used to withdraw any two elements which are held together by frictional contact.

Referring now to the drawings in which like reference numerals designate similar parts, 1 represents the end of a shaft having mounted thereon a hub 2 and attached to the shaft by means of a tapered key 3 which is usually employed in such unions.

My extractor comprises a yoke 4 which is substantially of a U-shape, in the center of the cross head 5 of which, is slidably mounted a screw-threaded bolt or stem 6. This stem carries on its inner end and between the legs of the U-shaped yoke a head 7 which is preferably composed of practically one solid piece of metal having two rectangular shaped ways 7' formed upon one side thereon and converging toward the free end 8 of the head.

Within the ways 7', I slidably mount gripping fingers 9—9 which are held therewithin by means of a relatively thin cover plate 10 which is attached to the head 7 by means of suitable screw bolts 11. In the upper face of each finger 9 adjacent the cover plate 10 is a longitudinal groove 12 for the reception of the inwardly protruding end of set screws 13 which are screw-threaded through the cover plate 10. These set screws are designed to keep the fingers from slipping out of the device when the same is not in use.

The grooves 12 terminate adjacent each end of the fingers. The gripping ends 14 of the fingers 9 are serrated upon their inner faces as at 15 to properly insure a tight hold upon the key 3.

The operating means of the extractor comprises an elongated nut 16 which is screw-threaded and fitted upon the outer end of the stem 6, and when in action, engages the yoke 5.

The operation of my device is as follows: The extractor is placed upon the key as illustrated with the gripping ends 14 of the fingers 9 engaging the key 3. By use of an ordinary wrench upon the nut 16, the downwardly screwing of the same will draw outwardly upon the head 7 carrying with it the fingers 9—9 which, at first, slightly impinge the key 3, but as the draft continues, will most forcibly engage the key due to the inclination of the ways acting upon the fingers. A continued turning of the nut 16 will, after the key has been tightly clamped, withdraw the same as is readily understood.

While I have spoken of the head 7 being preferably composed of partially one solid piece of metal it will be understood that the cover 10 may be made considerably heavier in proportion and be let down into the grooves 7' and also overlapping at the outer edges as at 15 to further strengthen the upper face of the head 7 if so desired.

Having thus fully described my invention what I claim and desire to secure by Letters Patent is:

1. An extractor comprising a U-shaped body portion, a screw-threaded bolt mounted within the said body portion, a head mounted on the said bolt within the body portion, the said head having converging ways, and gripping levers slidably mounted within the said ways.

2. A key extractor comprising a U-shaped body portion, a screw-threaded bolt mounted within the said body portion, a nut carried by the bolt outside the body portion and adjacent thereto, a head carried by the bolt within the body portion, the said head having converging ways, gripping levers slidably mounted within the said ways, the said levers having grooves, screws carried by the head entering the said grooves, the parts arranged as and for the purpose described.

In testimony whereof I hereunto affix my signature in the presence of two witnesses.

CHARLES C. R. HAMMAR.

Witnesses:
W. J. THOMAS,
B. W. ROBERTS.